Jan. 2, 1940.  W. R. GRISWOLD  2,185,730
MOTOR VEHICLE TRANSMISSION
Filed Nov. 30, 1935  3 Sheets-Sheet 1
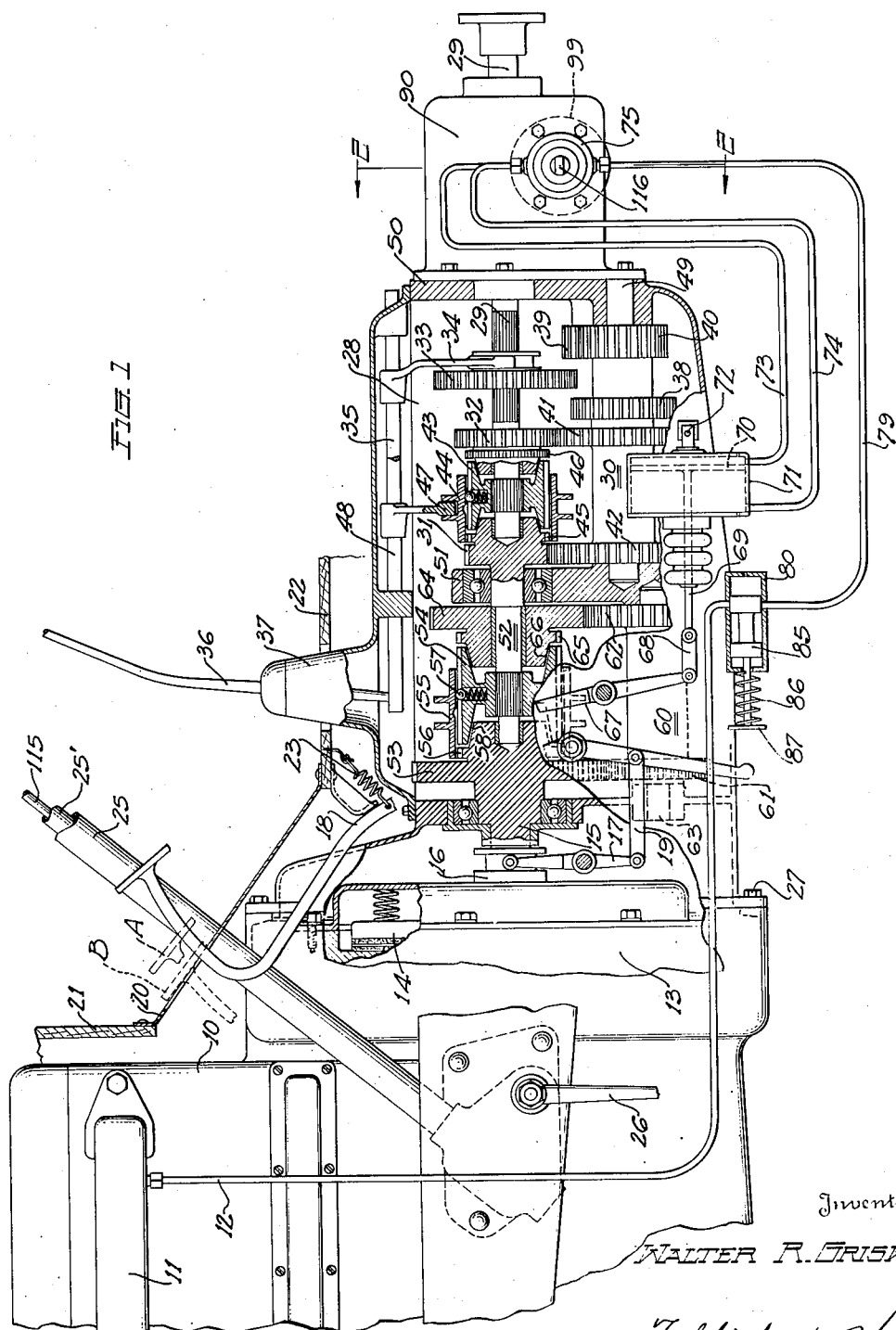
Inventor
WALTER R. GRISWOLD
By Tibbetts & Hart
Attorneys

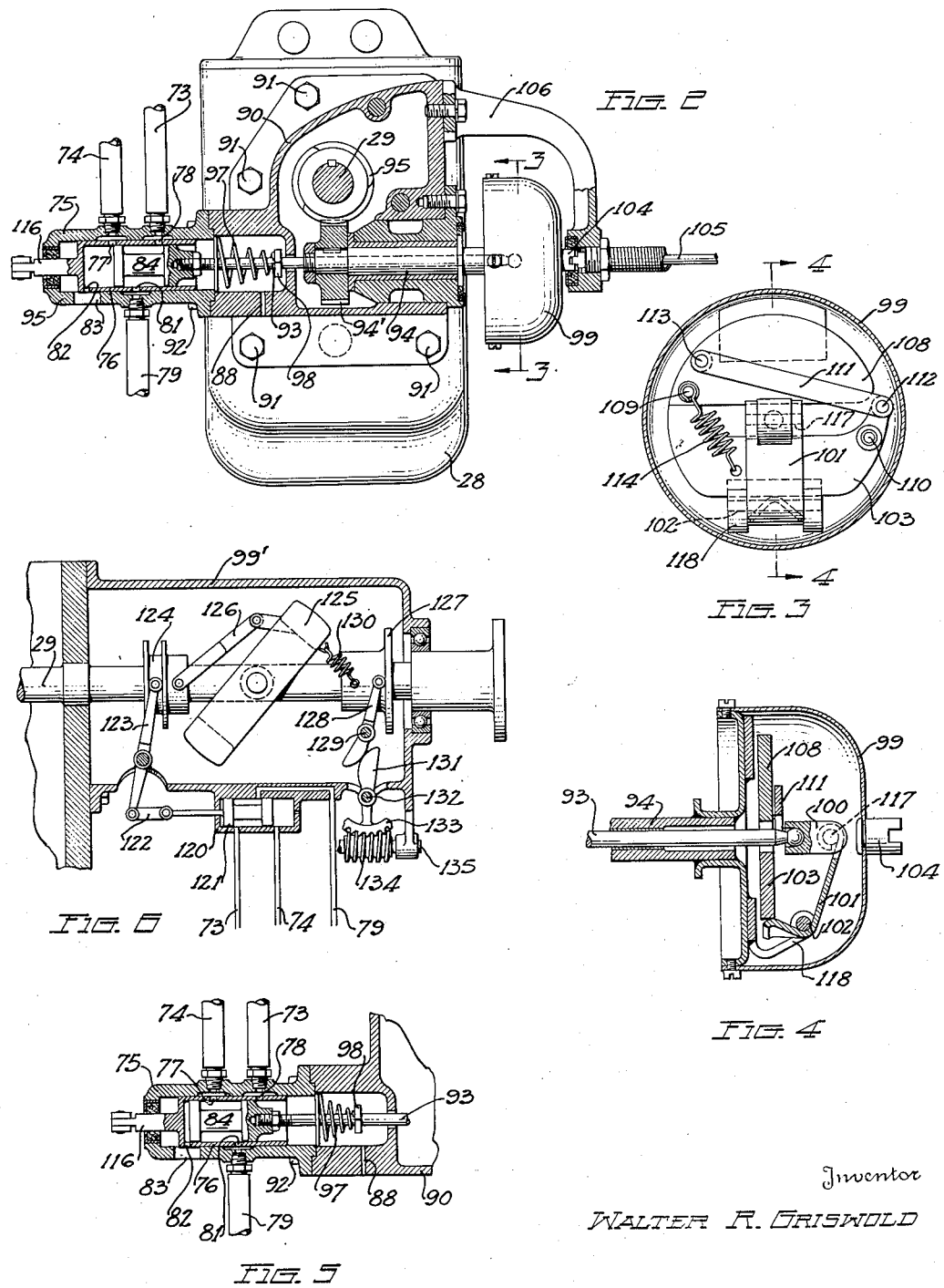

Jan. 2, 1940.　　W. R. GRISWOLD　　2,185,730
MOTOR VEHICLE TRANSMISSION
Filed Nov. 30, 1935　　3 Sheets-Sheet 3

Inventor
WALTER R. GRISWOLD
By Tibbetts & Hart
Attorneys

Patented Jan. 2, 1940

2,185,730

UNITED STATES PATENT OFFICE 2,185,730

MOTOR VEHICLE TRANSMISSION

Walter R. Griswold, Detroit, Mich., assignor to Packard Motor Car Company, Detroit, Mich., a corporation of Michigan Application November 30, 1935, Serial No. 52,392

11 Claims. (Cl. 192—3.5)

This invention relates to power transmission mechanisms for motor vehicles and more particularly to transmission mechanisms having over drive gearing incorporated therein.

In the association of over drive mechanism with power transmission mechanisms which have been used commercially, it is customary to employ either automatic or manually operable shifting means for placing the over drive means in operable or inoperable relation. Actuation of the main power clutch and the shifter mechanism for the over drive connection is required when the control is manual and thus an additional shifting effort is placed on the driver in the use of such a mechanism as compared with the effort required to shift the usual transmission in which there is no overdrive mechanism. When the shift is automatic, a free wheeling clutch has been employed but this is undesirable because physical effort is often required to brake the vehicle.

An object of this invention is to provide drive mechanism for motor vehicles having over drive gearing which is controlled by a minimum physical effort on the part of the driver and without the use of a free wheeling clutch.

Another object of the invention is to provide a transmission mechanism with over drive gearing which is associated with the conventional change speed gearing so that each of the sets of change speed gearing can be operated at two speed ratios from the main source of power.

A further object of the invention is to provide a control mechanism for over drive gearing which is entirely automatic in its operation but controlled manually and with which a free wheeling clutch is not required.

Still another object of the invention is to provide power control mechanism for shifting an over drive clutch which can be set in varying relations to be effective above a desired vehicle speed.

Another object of the invention is to provide power operated clutch control means for over drive gearing in a transmission mechanism which will become automatically effective above a predetermined vehicle speed and automatically ineffective below such speed and which will automatically disconnect the transmission mechanism from its driver after the over drive mechanism has become ineffective.

Other objects of the invention will appear from the following description taken in connection with the drawings, which form a part of this specification, and in which:

Fig. 1 is a side elevational view, partly in section and partly broken away, of a power transmission mechanism incorporating the invention.

Fig. 2 is a sectional view taken on line 2—2 of Fig. 1 showing some of the details of the control for the clutch establishing direct or over drive relationship of the transmission mechanism.

Fig. 3 is a sectional view taken on line 3—3 of Fig. 2 showing in detail the governor associated with the power clutch.

Fig. 4 is another sectional view of the governor taken on line 4—4 of Fig. 3.

Fig. 5 is a fragmentary reduced sectional view of the power clutch control shown in Fig. 2 with the elements in a different relation.

Fig. 6 is a sectional view of a modified form of power clutch control mechanism.

Figures 7, 8, 9:
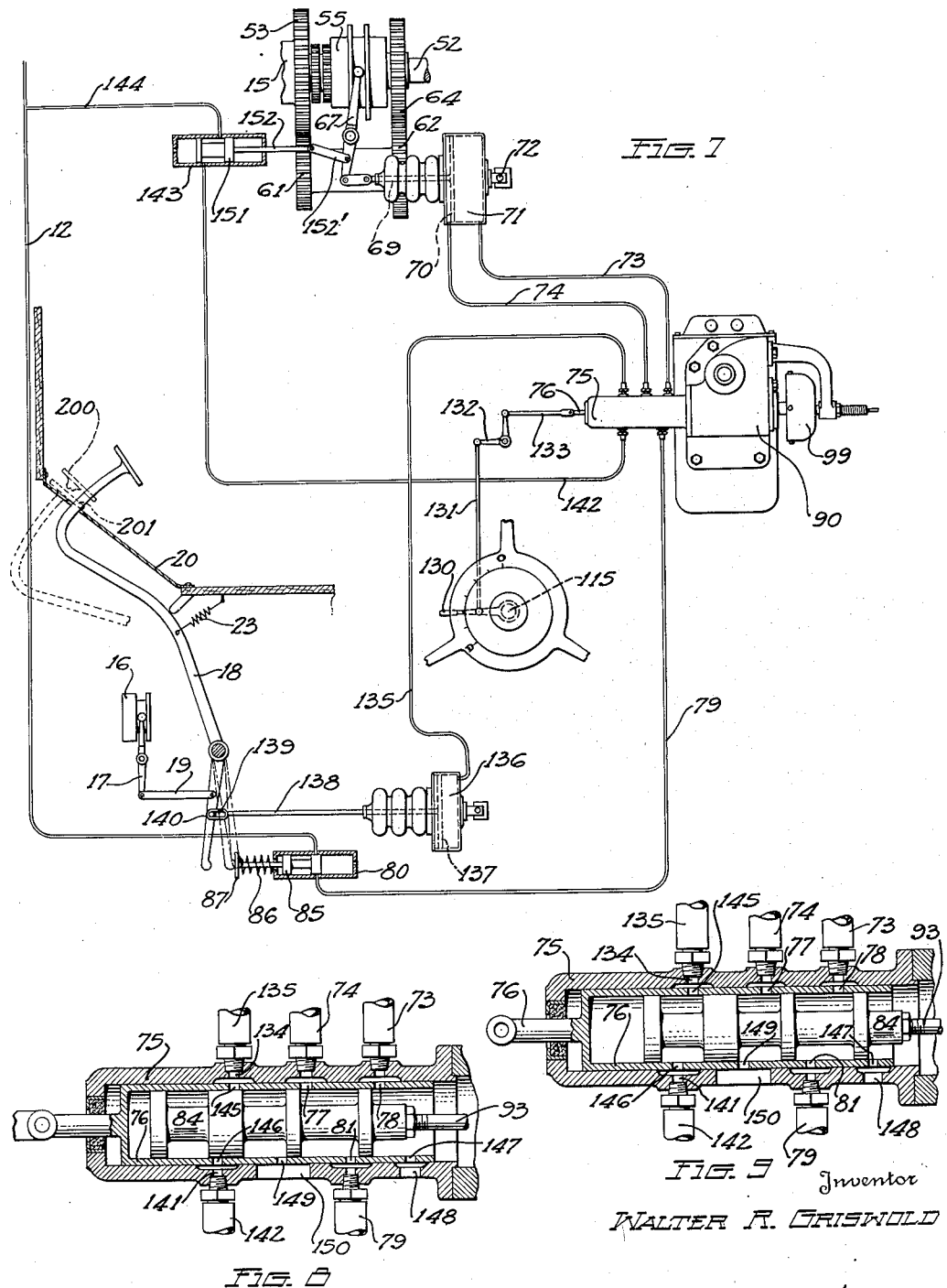
Fig. 7 is a diagrammatical view of another modified form of the invention.
Fig. 8 is a sectional view of a part of the power control mechanism shown in Fig. 7.
Fig. 9 is a sectional view similar to that in Fig. 8 with the parts in a different position of adjustment.

One form of the invention is shown in Figs. 1 to 5 inclusive, wherein there is a power plant 10 of a motor vehicle in the form of an internal combustion engine having a fuel intake manifold 11 with which a main power line 12 is connected. Connected with this power unit, in the conventional manner, is arranged a flywheel 13 having a conventional form of main clutch 14 associated therewith and contained within the usual housing. A drive shaft 15 is connected to be driven by the clutch and the clutch is controlled, that is, thrown out, by a collar 16 shiftable on the drive shaft by a pivoted fork 17 connected with the foot lever 18 by a link 19. The foot lever extends through the toeboard 20 which is fixed to the dash 21 and the floorboard 22. The usual form of spring 23 is connected with the floorboard and attached to the clutch lever to hold the pedal portion thereof normally in its rearmost position. When the foot lever is in released position, as shown in Fig. 1, then the mechanism associated therewith to operate the collar is in position wherein the clutch is in engaged relation to connect the flywheel 13 with the drive shaft 15.

The steering mechanism is conventional and includes a hollow steering post 25 in which is an actuating tube 25′ operated by the usual hand wheel for transmitting motion to the steering link 26.

Connected to the rear end of the engine housing by bolts 27 is a gear case 28 in the rear portion of which is arranged a driven shaft 29, aligning with the drive shaft 16, and a gear sleeve 30 which is mounted in parallel relation with and below the driven shaft 29. Gear 31 is fixed on the rear end of an intermediate driven shaft 52 and gear 32 is rotatably mounted on the driven shaft 29. Another gear 33 is slidably keyed on the shaft 29, such gear being shifted axially by means of an arm 34 carried by a rail 35 which is adapted to be shifted back and forth by mechanism including a lever 36, of a conventional type, which is pivotally mounted in pedestal 37. Gear 33 is shiftable to mesh with a low direct speed gear 38 on the sleeve 30 and with a reverse gear 39 mounted in meshing relation with gear 40 fixed on the sleeve 30. Gear 32 meshes with the second forward speed gear 41 and gear 31 meshes with a gear 42, gears 41 and 42 being fixed on the sleeve 30. Between the gears 31 and 32 is a suitable clutch element 43 shiftably splined to the driven shaft and with which a shiftable clutch element 44 is in positive driving relation. With the clutch means and the adjacent ends of the gears 31 and 32 is arranged a suitable synchronizer mechanism, the clutch element 43 being initially movable axially with the clutch element 44 so that it will be frictionally engaged with shaft 52 on gear 32 before element 44 engages with a positive clutch 45 adjacent and formed with gear 31 or with a positive clutch 46 adjacent to and formed integral with the gear 32. This clutch structure is shifted axially by a fork 47 fixed on rail 48 which is adapted to be shifted in the usual manner by the shift lever 36.

Sleeve 30 is rotatably mounted upon a shaft 49 carried at one end in the end wall 50 of the gear case and carried at the other end by a wall 51 within the gear case. The intermediate shaft 52 telescopes into an axial recess in a gear 53 formed on the rear end of shaft 15 and is mounted adjacent its other end in a bearing in the wall 51. The rear end of this intermediate shaft 52 is recessed axially to receive the forward end of the driven shaft 29 and serves as the bearing therefor.

There are two connecting means between the drive shaft 15 and driven shaft 29; one of these connections forms a direct drive and the other connection forms an over drive wherein the driven shaft is rotated through gearing which rotates it faster than the drive shaft. Slidably splined on the shaft 52 is a clutch membr 54 with which cooperates an axially movable clutch member 55. These clutch members have interengaging teeth and the member 55 is adapted to be shifted forwardly to engage with positive clutch teeth 56 formed at the rear end of the drive gear 53. A spring pressed ball means 57, carried by the clutch member 54 engages a recess in the clutch member 55 so that when the member is shifted it moves the member 54 with it to frictionally engage a cone surface 58 at the end of the positive clutch member 56. After such frictional engagement has synchronized the speed of the clutch member 54 with the gear 53, further shifting of the member 55 engages the teeth thereof with the positive clutch 56. When the positive clutch member 55 is engaged with the positive clutch teeth 56 then the drive is transmitted from the shaft 15 through the clutch member 54 to the intermediate shaft 52 and rotates the gear 31 which is integral therewith. Shifting the clutch member 44 to engage with the positive clutch 45, formed integrally with the gear 31, causes the direct drive to be continued to the clutch elements 44 and 43 to rotate the shaft 29. This drive means just described is preferably of a nature such that the shaft 29 will be rotated at the same speed as the drive shaft 15 and, consequently, there is a direct drive. The second speed drive is obtained by shifting the clutch 44 into engagement with the positive clutch 46 whereupon the gear 31 rotates the gear 42 on the sleeve 30 which in turn rotates the gear 41 which meshes with the gear 32 and the drive is transmitted through the clutch members to the shaft 29. Likewise, when the clutch 44 is disconnected, the drive through gear 31 to gear 42 rotates the sleeve and the gears 38 and 40 so that the reverse gear 39 is rotated or the low speed gear 38 is rotated. Upon shifting the gear 33 into mesh with either the gear 38 or 39, reverse or low forward drive respectively is established.

In order to provide an over drive there is a sleeve 60 on which is fixed gear 61 and a gear 62, such sleeve being rotatably mounted on shaft 63 located below and parallel with the intermediate shaft 52. Gear 61 meshes with the drive gear 53 and gear 62 meshes with a gear 65 rotatably mounted on shaft 52 adjacent its rear end. Formed integrally with this gear 64 is a positive clutch 65 and a synchronizer cone 66. When an over drive is desired, the clutch member 55 is shifted rearwardly to engage the teeth of the positive clutch 65 but prior to such engagement the synchronizing portion of the clutch elements operates to bring the gear 64 and the clutch member 55 to the same speed. When the gear 64 is engaged by the clutch 55, then the drive is from gear 53 to gear 61 which in turn rotates the gear 62 through being fixed on the same sleeve. Gear 62 meshes with the gear 64 and drives the positive clutch members 55 and 54 and the shaft 52. The change speed mechanism is shifted into any of the gear ratios, as previously described, to transmit power to the shaft 29. When the clutch 44 engages the positive clutch 45 then the drive is from the positive clutch 45 through the clutch elements 44 and 43 to the shaft 29 and, under such circumstances, the over drive gearing is of a character such that the shaft 29 will be driven at a higher rate of speed than the drive shaft 15 is rotated. Of course, this over drive can be used with any of the speed ratios in the mechanism previously described but it is very seldom that over driving is used in any speed but high.

The lever 36 which is manually shiftable controls the reverse and low gear connections through shifting of the gear 33, and high and second speed are controlled by the shift lever 36 through control of the clutch element 44. The main clutch is controlled by the foot lever 18. Whenever there is a change in the gearing arrangement to associate shift from direct or over drive, or when the change speed or reverse connections are to be shifted, then it is always necessary to press the clutch lever 18 downwardly to shift the main clutch control collar 16 to disengage the clutch.

Power means is provided for shifting the clutch for engaging and disengaging the mechanism in direct or over drive relation. A forked lever 67 is associated with clutch member 55 for shifting the same and is suitably pivoted on the gear casing. The lower end of this lever is connected by a link 68 with a rod 69 to which is fixed a piston 70 arranged to slide in a power cylinder 71 and this power cylinder is suitably anchored to the gear case as indicated at 72. A power line 73 connects with one end of the cylinder and another power line 74 connects with the other end of the cylinder and such power lines are controlled automatically by suitable mechanism, such as a governor, so that the over drive mechanism can be shifted into operable relation above a predetermined vehicle speed. These power lines 73 and 74 are connected with a selector valve cylinder 75, in which is slidably mounted a manually operable sleeve valve 76 having ports 77 and 78 formed therein and adapted to register respectively with the power lines 74 and 73. Another power line 79 is connected to communicate with valve cylinder 75 and with a control valve cylinder 80 with which the power line 12 is also connected to communicate. The valve sleeve 76 is also formed with a port 81 which is adapted to communicate with power line 79 intermediate the ports 77 and 78. The control valve sleeve 76 is also provided with port 82 adjacent one end which is adapted to communicate with a port 83 leading through the valve casing and opening to atmosphere.

Within the valve sleeve 76 is another valve element 84 in the form of a plunger having a reduced portion intermediate its ends and its end portions slidably mounted within the valve sleeve 76 and having a sliding fit therein. The valve element 84 is movable axially to connect either of the ports 77 or 78 with the port 81 whereby the power line 79 can be selectively opened to either one of the lines 73 or 74 in order to move the piston 70 in the power cylinder in either of opposite directions to engage or disengage the clutch member 55 with the clutch element associated with either of the gears 53 or 64.

The connection between the power line 12 and the power line 79 is controlled by the position of a valve 85 and valve sleeve 76 in the selector valve housing. The valve is normally held to close communication through the valve housing 80 by means of a coil spring 86 engaging one end of the valve housing and an abutment 87 on an extended portion of the valve 85. This abutment 87 is so positioned that the lower end of the clutch controlling foot lever will first engage the same when the treadle is moved into a position disengaging the clutch on the shaft 15 as indicated in dotted lines at A and upon further movement of the treadle toward the floorboard the lower end thereof, as indicated in dotted lines at B, will engage the abutment 87 and move it axially whereby the valve will be shifted to establish communication between the power lines 12 and 79. When the valve elements 76 and 84 are in the position shown in Fig. 2, then the power cylinder will be open to the engine manifold through the power lines 73, 79 and 12 and the piston 70 will be drawn to the rear end of the power cylinder by suction and the clutch member 55 will be thereby positioned as shown in Fig. 1 so that over drive will be disengaged and direct drive will be formed to shaft 52 through clutch member 54. When these valve elements 76 and 84 are in the position shown in Fig. 5, then the power line 74 is in communication with the power lines 79 and 12 so that engine created suction will move the piston 70 to the left, as shown in Fig. 1, and thereby shift the control lever 67 so that the clutch member 55 is moved rearwardly to engage the positive clutch 65 whereupon over drive relation of the mechanism is formed and, under such circumstances, the power line 73 communicates with atmosphere through a port 88 in the valve casing and when the valve elements are in the position shown in Fig. 2, then the power line 74 communicates with atmosphere through the ports 77, 82 and 83. Before these suction conditions are established with the engine, it is of course necessary to shift valve 85 to connect line 12 with line 79.

Over drive is ordinarily only desired when the motor vehicle is traveling upon an open highway above a predetermined speed which with different drivers and under different circumstances may vary. In order to automatically control the power cylinder, governor means is associated with the valve element 84 for shifting its position to open or close ports 77 and 78 in the valve element 76 so that one or the other will be opened to the power line 79 and in position to be effective to control the power cylinder when the valve 85 is moved to establish communication between the lines 12 and 79. A casing 90 is fixed by bolts 91 to the rear end of the gear casing and the valve casing 75 is secured thereto by bolts 92. Extending through the casing 90 is a shaft 93 on which a sleeve 94 is rotatably mounted. Fixed on the sleeve 94 is a gear 94' which meshes with gear 95 on the driven shaft 29. This shaft 93 is screwed into the valve element 84 and a spring 97 engages an abutment 98 on the shaft and the end wall of the valve casing and exerts a pressure normally urging the valve element 84 into a relation opening the port 78 to the port 81 in which position the power means is arranged to move the clutch 55 into direct driving relation with the drive shaft. The shaft 93 extends through the sleeve 94 and into a governor casing 99 where it is engaged by the connector 100 having an operating element 101 pivoted on a pin 117, carried thereby. The governor casing 99 is suitably fixed to the outer end of sleeve 94 so that it rotates therewith and is driven from the driven shaft through means of gears 94' and 95. This operating element pivots about a pin 102 carried by an arm 118, such arm being welded to the wall of the governor casing, and is actuated by a weight 103 responsive to centrifugal force. The housing 99 is provided with a driving socket 104 with which a speedometer cable 105 is associated. Another weight 108 is carried within the governor casing and such weight is pivoted to the casing at 109, the weight 103 being pivoted to the casing at 110. The weight 103 is formed with an arm to which a link 111 is pivoted at 112 and the other end of such link is pivoted to the weight 108 at 113 so that the weights will move in a parallel relation through such connection as centrifugal force tends to move them outwardly. A coil spring 114 is connected on the pivot 109 at one end and to the weight 103 at the other end and serves to resist the effort of centrifugal force tending to move the weight elements outwardly. Until a certain vehicle speed is attained, the spring 114 is sufficient to prevent movement of the weights 103 and 108 from the position shown in Fig. 3 but above such speed the weights move outwardly so that the weight 103 will pivot the element 101 to move the connector 100 and the shaft 93 associated therewith in a direction to move the valve connected to the shaft 93 away from its normal position and into a position where the port 77 is placed in communication with the port 81 and the port 78 is shut off from communication with the port 81. Under such circumstances, there will be no suction operating in line 73 and the engine manifold will be connected with a line 74, when the valve 85 permits, to move the power piston 70 toward the lever and thereby shift the clutch member 55 into engagement with the positive clutch 65 thereby placing the over drive gearing in driving relation.

In order that the vehicle speed at which the valve 84 is shifted to establish communication between the ports 77 and 81 may be readily varied as desired, I provide a manual control. This control is preferably arranged in easy reach of the driver of the vehicle and consists of a rod 115 which extends through the hollow steering shaft 25' to a point adjacent the steering wheel where it can be rotated. This shaft 115 is connected by a suitable mechanism (not shown) to the end 116 of the valve element 76 which projects through the end of the valve casing. By being able to shift the position of the valve 76 axially with respect to the valve element 84, the ports 77 and 78 will be shifted so that more or less movement of the valve element 84 is required to switch over the vacuum means from line 73 to line 74, or vice versa, and thus adjustment of the valve 76 will establish a port relation whereby the valve 84 will be effective at any desired speed of vehicle movement.

It will be seen that the power control of clutch member 55 is not effective until the clutch control lever 18 is moved to shift the valve 85 to establish communication between the power line 12 and the power line 79, and that such valve shifting position of the clutch foot lever is only possible after it has been moved to a position where the main clutch connecting the shaft 15 with the flywheel has been released. In this manner the power means will never be able to function unless the power clutch is disengaged.

In Fig. 6 I have illustrated a different form of governor than that previously described wherein the effectiveness of the governor to operate the power control valve can be manually adjusted instead of adjusting one of the valve elements associated with the power lines. In this modified form of the invention the driven shaft 29 extends through a governor casing 99' and such casing is formed with a valve chamber 120 in which a valve 121 is slidably mounted. In this instance the power line 74 leads into one end of the selector valve chamber and the power line 73 leads into the other end of the chamber while the power line 79 leads into the chamber intermediate the lines 73 and 74. The selector valve 121 is formed to selectively establish communication from the power line 79 and either of the power lines 73 or 74. This valve is formed with an extended portion which projects through the valve casing and is connected by a link 122 with a forked lever 123 which engages a collar 124 axially movable on the driven shaft 29 and this collar is connected with a governor ring weight 125 by a link 126. The governor weight encircles a portion of driven shaft 29 and is carried by a pair of diametrically opposite pivot members 126 fixed to the governor casing. Carried on the shaft 29 is another collar 127 which is adapted to be shifted axially by lever 128 pivoted to the governor casing at 129. Connecting the governor ring with the collar 127 is a coil spring 130. The end of the lever 128, remote from the end engaging the collar 127, is in the form of a cam which engages with the cam end of a lever 131 pivoted at 132 to the governor casing and extending therethrough. On this lever 131 is a suitable gear segment 133 meshing with a worm 134 on a shaft 135.

Suitable mechanism connects shaft 135 with the shaft 115 so that rotation thereof from a point adjacent the hand wheel will definitely position the lever 131 and the contact lever 128. As the position of the lever 128 determines the tension of the spring 130, adjustment of such mechanism determines the speed at which centrifugal force operates to shift the ring weight 125 on its pivots to move the lever 126 and collar 124 to operate the lever 123 and link 122 connected with the valve 121. In the position shown in Fig. 6, power line 79 is open to the power line 73 and under such circumstances, the power cylinder and piston are influenced by suction to move the clutch 55 into direct drive relation when the valve 85 is moved to connect the power line 12 with the power line 79. When the vehicle speed increases so that it is greater than this predetermined amount, then centrifugal force overcomes the action of the spring 130 and the ring weight 125 moves in a direction toward the vertical forcing the link 126 and the collar 124 in a direction toward the forward end of shaft 29 and rocking the lever 123 to move the valve 120 in a direction toward the rear of the driven shaft 29 so that at a predetermined speed the valve 120 is shifted to close communication between lines 73 and 79 and to establish communication between lines 74 and 79. When power lines 74 and 79 are in communication and the valve 85 is shifted to establish communication between line 79 and the line 12, then the clutch 55 is moved by suction into a position to form the over drive connection.

When it is desired to change the speed at which the over drive will become effective, then the shaft 135 is rotated and through means of the worm 134 will rock the lever 131 and shift the lever 128 and the collar 127 changing the tension of spring 130 which must be overcome by centrifugal force in order to shift the valve 121. This manner of adjusting the governor can be readily accomplished by the driver through manipulation of the shaft means 115 which extends adjacent the vehicle steering wheel.

In Figs. 7 to 9 inclusive, there is illustrated another modified form of the invention wherein power means is employed to control the clutch which establishes a direct or an over drive connection and, in addition thereto, is automatic means for disconnecting the main clutch associated with the drive shaft. In describing this form of the invention, the same numerals used in Figs. 1 to 5 will be used whenever possible. The two connecting means from the drive shaft 15 to the intermediate shaft 52, clutch element 55, a shift lever 67 and the power means for shifting the clutch member 55 are substantially the same as previously described. Power lines 73 and 74 lead to opposite ends of the power cylinder 71 and within the power cylinder is a piston 70 from which a rod 69 is connected and extends through a wall of the cylinder. The cylinder is attached to the crank case by a suitable fastening means, as indicated at 72. 12 indicates the power line leading from the engine intake manifold and 79 indicates a power line leading to a valve casing 75 with which the power lines 73 and 74 are connected. Between the power lines 12 and 79 is a valve casing 80 in which operates a valve 85 to establish or disconnect communication between the lines 12 and 79; such valve has an extended portion with an abutment 87 which is normally held in position by a spring 86 to move the valve 85 into a position closing communication between the lines 12 and 79. A clutch operating foot lever 18 is suitably pivoted to a transmission casing and has a link 19 pivoted thereto and connecting with lever 17 for throwing out the control collar for the clutch 16, the clutch being normally engaged by suitable springs in the conventional manner and the clutch lever 18 being held with the treadle portion in outermost position from the toeboard 20 by spring 23. The governor housing 99 is associated with casing 90 to which the valve housing 75 is suitably secured. The means for driving the governor is the same in this case as that illustrated in the first described form of the invention.

Associated with the control rod 115 is a lever 130 projecting from the steering wheel and operable to rotate the rod. Fastened to the bottom of the rod 115 is a link 131 connected to bell crank 132 with which the cylinder valve 76 is connected by a link 133. This form of hand control can also be utilized for the valve shown in Fig. 1.

In addition to the mechanism so far described, I associate power means for automatically moving the clutch pedal into a position for disengaging the main clutch when the governor mechanism shifts the valve element 84 from a relation adapted to establish over drive to a relation adapted to establish direct drive and in this way the vehicle will start coasting. The driver's attention will thus be called to the fact that there is no positive drive between the power plant and the transmission mechanism whereupon he depresses the clutch pedal sufficiently to cut off the power line 79 whereupon the clutch pedal is released and positive direct drive is established.

In order to accomplish this result, the selector valve cylinder 75, in this form of the invention, is formed longer than that shown in Fig. 1 and has an additional port 134 with which a power line 135 connects. This power line also connects with one end of a second power cylinder 136 in which is a piston 137 having a rod 138 fixed thereto and extending beyond the power cylinder. The end of the rod is formed with a slot 139 through which a pin 140, fixed on the clutch lever 18, extends. There is also a port 141 in the valve housing 75 located substantially diametrically from the port 134, with which is connected a power line 142 and such power line leads to a master valve casing 143. Another power line 144 branches from the main power line 12 and connects with this valve housing 143. The valve element 76, in this form of the invention, is also longer than that of the first described embodiment of the invention and is formed with ports 145 and 146 which are respectively arranged to communicate with ports 134 and 141 in the valve casing. The valve element shaft 93 is controlled by a governor in the same manner as illustrated in the first described embodiment of the invention and the valve element 84 is of a slightly different form than that previously described, it being longer and provided with three peripheral recesses to control communication between power lines 79 and 73 and 74 as well as between power lines 135 and 142 through opening or closing port 145 relative to port 146 or selectively connecting port 81 with either ports 77 or 78. The cylinder valve element 76, in this embodiment is formed with the port 147 which is adapted to communicate with the air port 148 in the valve casing and also with another port 149 which is adapted to communicate with the valve 150 in the cylinder, such communications being established upon the selector valve elements being in certain positions.

In the valve casing 143 is a master valve 151 from which extends a rod 152. This rod is pivotally connected by a link 152' to the clutch shift lever 67 which is connected to be actuated by the piston rod 69.

The hand lever 130 can be set so that the selector valve elements 76 and 84 cooperate to shift the connection from one to the other of power lines 73 or 74 at some given speed; Fig. 8 discloses the position of the valve elements when arranged for the over drive gearing to be effective. When in such position, the port 81 is in open communication with the power line 79 and the port 77 is in open communication with the power line 74 so that when the foot lever 18 is pressed down to the floorboard, then the main clutch is disconnected and the valve 85 is moved to establish communication between the power lines 12 and 79. Suction operates to move the piston 70 to the left and moves the rod 69 therewith to shift the lever 67 so that the clutch 55 will engage the positive clutch adjacent the gear 64 as shown in Fig. 7 and over drive is thus established as previously described. When the valve elements are in such position, the power line 73 is open to atmosphere through the ports 78, 147 and 148. In this same position the valve element 84 shuts off communication between the power lines 142 and 135 so that no suction will be created in the power cylinder 136. When the speed gets below that for which the lever 130 is set, the governor will move the valve element 84 to the right into the position shown in Fig. 9, whereupon power line 79 will be placed in communication with power line 73 and power line 74 will be opened to atmosphere through ports 77, 149 and 150. At the same time, power lines 142 and 135 will be in communication through ports 134, 145, 146 and 141. Of course the clutch will not be shifted into direct drive relation even though the valve control mechanism is so arranged that this will take place because no power will flow through the valve means until the control valve 85 is opened through pressing the main clutch lever 18 to the floorboard. Under such circumstances, the power line 144 which branches off of the main power line 12 will be in communication with the power line 142 through the location of the master valve 151 in the valve casing when the clutch shifting mechanism is in direct drive relation and the cylinder 136 will be open to suction so that the piston 137 is thereby automatically moved to the right and draws the main clutch lever 18 therewith into a position engaging the abutment 87 of the valve 85. Under such circumstances, the main clutch is disconnected automatically and no power will be transmitted to the drive shaft 15 and in this manner the operator will realize that the vehicle speed is below that at which over drive is desired. After being so warned of this speed condition, the driver then presses the lever down beyond clutch released position, as shown in dotted lines at 200, into engagement with the floorboard, as shown in dotted lines at 201, whereupon the lever 18 will move the abutment and valve 85 to the right thus connecting the valve chamber 75 with the intake manifold so that the suction will operate through power lines 79 and 73 to shift the piston 70 to the right and thereby engage the clutch 55 with the positive clutch associated with the gear 53, whereupon the transmission mechanism is again in direct driving relation and the clutch can be released to again engage the main clutch associated with the driving shaft 15. The slotted end of the rod 138 permits this operation of the valve 85 after the clutch foot lever has been moved to the position shown at 200, that is, clutch disengaging position.

The mechanism just described adds to the structure shown in Figs. 1 to 6 inclusive, a means for notifying the driver that the vehicle is traveling below a speed at which over drive is desired through automatically releasing the main clutch. The power controlling mechanism for automatically releasing the clutch is controlled by the position of the valve elements which control the power clutch to shift the selector clutch and establish direct or over drive connection between the drive or driven shafts. This arrangement provides a simple and compact manner of accomplishing this desirable result.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In mechanism of the class described, a source of power, a drive shaft, main clutch means normally engaging said drive shaft with said source of power, a foot lever for disconnecting said clutch, a driven shaft, over drive gearing in driven relation with said drive shaft, a second clutch shiftable to engage said driven shaft directly with said drive shaft or said over drive gearing, shifting mechanism for said second clutch, power means for actuating said shifting mechanism, a valve for controlling said power means arranged to be opened by said foot lever while the main clutch is disengaged, power means for moving said foot lever to clutch disengaging relation, and speed responsive means for controlling both of said power means, said speed control means establishing effectiveness of said lever actuating power means when the driven shaft rotates below the speed at which over drive is desired.

2. In mechanism of the class described, a source of power, a drive shaft, a main clutch normally connecting said source of power and said drive shaft in driving relation, means physically operable to disengage said clutch, a driven shaft, over drive gearing in driven relation with said drive shaft, a positive clutch shiftable to connect said driven shaft with said drive shaft or said over drive gearing, power means operable to shift said positive clutch, and power means effective to move said physically operable means and disengage said main clutch when over drive of the driven shaft falls below a predetermined speed.

3. In mechanism of the class described, a source of power, a drive shaft, a main clutch normally connecting said source of power in driving relation with said shaft, a foot lever operable to disengage said clutch, a driven shaft, change speed gearing in driven relation with said drive shaft, a clutch shiftable to engage said driven shaft in direct driving relation with said drive shaft or said change speed gearing, mechanism operable to shift said last mentioned clutch including a piston and cylinder, a source of fluid power, a housing, connections leading from said housing to said cylinder and said source of fluid power, mechanism for actuating said foot lever including a piston and cylinder, connections between said housing and said last mentioned cylinder, a speed controlled valve in said housing controlling the connections associated therewith, a normally closed valve controlling the fluid flow in the connection between said housing and the source of supply, said valve being adapted to be opened by said foot lever in its movement after disengaging the main clutch, said valve in the housing establishing communication between the source of power and the foot lever operating mechanism to disengage the clutch by power when shifted from relation establishing change speed connection.

4. In mechanism of the class described, a drive shaft, a driven shaft, a main clutch release foot lever, change speed gearing in driven relation with said drive shaft, a positive clutch shiftable to establish a drive from said drive shaft or said change speed gearing to said driven shaft, power operated means connected to shift said positive clutch including a cylinder and piston, a valve housing having connections leading to said cylinder on opposite ends of said piston, a source of fluid power, a connection between the source of power and the valve housing, valve means in said housing shiftable to selectively establish communication between the power feed connection and either of the connections leading to said cylinder, speed responsive means for actuating said valve, manually adjustable means for varying the effectiveness of said valve, and a valve in the main feed connection normally closing the same, said main feed control valve being arranged to be engaged and opened by said foot lever in its movement after the main clutch is disengaged.

5. In mechanism of the class described, a drive shaft, a driven shaft, over drive gearing in driving relation with said drive shaft, a clutch shiftable to establish a driving connection from said drive shaft or said over drive gearing to said driven shaft, fluid operated means for shifting said clutch, valve means for controlling said fluid operated clutch shifting means, governor means for controlling said valve means, and physically operable means for adjusting the governor means to vary the speed at which it actuates said valve means.

6. In mechanism of the class described, a drive shaft, a driven shaft, change speed gearing in driven relation with said drive shaft, clutch means shiftable to selectively connect said driven shaft directly with said drive shaft or with said change speed gearing, power means for actuating said clutch shifting means, a speed controlled valve means controlling the effective application of said power means to said clutch shifting means, and means for adjusting said valve means to regulate the effective application of said power means.

7. In mechanism of the class described, a source of power, a drive shaft, a main clutch normally connecting said source of power and said drive shaft in driving relation, means physically operable to disengage said clutch, a driven shaft, over drive gearing in driven relation with said drive shaft, a positive clutch shiftable to connect said driven shaft with said drive shaft or with said over drive gearing, power means operable to shift said positive clutch, and power actuated means effective to move said physically operable means to disengage said main clutch when over drive of the driven shaft falls below a predetermined speed.

8. In mechanism of the class described, a source of power, a drive shaft, main clutch means normally engaging said drive shaft with said source of power, a foot lever for disconnecting said clutch, a driven shaft, over drive gearing in driven relation with said drive shaft, a second clutch shiftable to engage said driven shaft directly with said drive shaft or with said over drive gearing, shifting mechanism for said second clutch, fluid power means for actuating said shifting mechanism, a valve associated with said power means arranged to be opened by said foot lever while the main clutch is disengaged, fluid power means for moving said foot lever to clutch disengaging relation, and speed responsive valve means for controlling both of said power means, said speed responsive valve means establishing effectiveness of said lever operating power means to release the main clutch when the driven shaft rotates below the speed at which over drive is desired.

9. In mechanism of the class described, a source of power, a drive shaft, a main clutch normally connecting said source of power and said drive shaft in driving relation, means physically operable to disengage said clutch, a driven shaft, over drive gearing in driven relation with said driven shaft, a positive clutch shiftable to connect said driven shaft with said drive shaft or with said over drive gearing, power means operable to shift said positive clutch, power means effective to move said physically operable means to disengage said main clutch when over drive of the driven shaft falls below a predetermined speed, and speed controlled valve means for controlling the application of the power means to said physically operable clutch disengaging means and said positive clutch.

10. In a drive mechanism in which a plurality of speed ratios can be established between a drive shaft and a driven shaft, means shiftable to establish a plurality of different speed ratio relations, suction means for actuating said shiftable means, a clutch through which drive from the drive shaft is transmitted, means shiftable to actuate said clutch, suction means for actuating said clutch shifting means, a selector valve operable to control the application of both suction means, a master valve for controlling the clutch suction means in advance of said selector valve, and means connected between said shiftable means establishing a plurality of speed ratios and said master valve to control the master valve position.

11. In a drive mechanism, a main clutch, a clutch shiftable to establish either one of two speeds, mechanism operable to shift said main clutch, mechanism operable to shift the change speed clutch, a source of suction, a suction line connected with the source of suction and associated to release the main clutch operating mechanism, a selector valve interposed in the power line for opening or closing the vacuum to the main clutch operating mechanism, a main suction line between the source of vacuum and the selector valve, a pair of suction lines leading from the selector valve to the speed changing clutch and selectively opened to the main suction line by the selector valve, a control valve in the main suction line adapted to be opened by the main clutch shifting mechanism in its releasing movement, a master valve in the suction line for the main clutch operating mechanism, actuating mechanism connecting said master valve with said change speed clutch operating mechanism, and means for shifting said selector valve.

WALTER R. GRISWOLD.